(12) United States Patent
Watanabe

(10) Patent No.: US 6,262,960 B1
(45) Date of Patent: *Jul. 17, 2001

(54) DISC DRIVING DEVICE

(75) Inventor: Toshio Watanabe, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,777

(22) Filed: Sep. 24, 1998

(30) Foreign Application Priority Data

Sep. 30, 1997 (JP) ................................. 9-267489

(51) Int. Cl.$^7$ ........................... G11B 33/02; G11B 17/04; G11B 17/08
(52) U.S. Cl. ........................... 369/77.2; 369/197
(58) Field of Search ................... 369/77.2, 197, 369/265, 270; 360/99.05, 99.06, 99.07, 99.12

(56) References Cited

U.S. PATENT DOCUMENTS

| | | |
|---|---|---|
| 2,762,627 | * 9/1956 | Johnson . |
| 4,541,086 | 9/1985 | Tanaka .................. 369/271 |
| 5,572,498 | 11/1996 | Choi ..................... 369/77.2 |
| 5,586,105 | 12/1996 | Mizuno et al. ......... 369/270 |
| 5,615,197 | * 3/1997 | Choi ..................... 369/77.2 |

FOREIGN PATENT DOCUMENTS

| | | |
|---|---|---|
| 61-227280 | * 10/1986 | (JP) . |
| 61-233465 | * 10/1986 | (JP) . |
| 62-192072 | * 8/1987 | (JP) . |
| 63-100688 | * 5/1988 | (JP) . |
| 63-173264 | * 7/1988 | (JP) . |
| 64-88952 | * 4/1989 | (JP) . |
| 5-334782 | * 12/1993 | (JP) . |
| 05234224 | 12/1993 | (JP) . |

* cited by examiner

Primary Examiner—Brian E. Miller
Assistant Examiner—Julie Anne Watko
(74) Attorney, Agent, or Firm—Ronald P. Kananen; Rader, Fishman & Grauer

(57) ABSTRACT

A disc drive device for holding plural discs of different sizes in stable state such as to provide a sufficient recording area for each disc. In addition, the disc drive device is adapted for setting the discs of different sizes accommodated in cartridges of different thicknesses at a predetermined height in order to run the disc in the cartridge in stability. With the disc drive device, turntables 31, 32 for rotatably holding the discs vary the holding areas for the discs depending on the disc size.

11 Claims, 19 Drawing Sheets

DISC DRIVING DEVICE

BACKGROUND OF THE INVENTION

1. Field of the Invention

This invention relates to a disc drive device for rotationally driving a disc-shaped recording medium.

2. Description of the Related Art

As a recording medium for recording information signals, a disc-shaped recording medium, abbreviated herein to a disc, having a disc-shaped substrate carrying a recording layer, is in widespread use.

This disc-shaped recording medium is housed in, for example, a cartridge to form a disc cartridge or is directly loaded on the disc drive device, without being housed in a cartridge. For this disc-shaped recording medium, information signals are recorded or read out by a head as the recording medium is run in rotation.

These discs of different diameter sizes have been proposed depending on the usage and application. Also, the disc cartridges of different sizes have been proposed depending on the size of the discs accommodated therein. The disc cartridge holding a small-sized disc is thinner in thickness than the disc cartridge holding a large-sized disc.

The disc drive device for rotationally driving these discs of different sizes is required to be able to cope with the discs of different sizes, that is to be compatible with respect to these discs.

However, with the discs of different sizes, the area of each disc held by the turntable of the disc drive device (holding area) is set to an optimum area depending on the disc size. The turntable of the disc drive device is also set to a diameter related to the size of the associated disc. In general, the larger the disc diameter, the broader is the holding area and the larger the size of the turntable.

Therefore, if a small-sized disc is to be run in rotation using a disc drive device associated with the large-size disc, the turntable encroaches into the disc recording area to decrease the recording capacity. Moreover, the head portion of the recording/reproducing apparatus tends to collide against the turntable.

On the other hand, if a large-sized disc is to be run in rotation using a disc drive device associated with the small-sized disc, the disc holding state is unstable to render it impossible to realize stable recording/reproduction.

Moreover, if, in case a disc is held in a cartridge and loaded as a disc cartridge in the disc drive device, the loaded cartridge differs in thickness, the disc height position in the disc drive device differs with the disc size to render it impossible to run the disc in rotation satisfactorily.

SUMMARY OF THE INVENTION

It is therefore an object of the present invention to provide a disc drive device which holds the discs of different sizes in stability so as to assure a sufficient recording area and in which the discs of different sizes held in cartridges of different thicknesses can be positioned at predetermined height to enable stabilized rotation of the discs held in the cartridges.

In one aspect, the present invention provides a disc drive device including a main body unit of the disc drive device, a disc holding unit for rotatably holding the disc-shaped recording medium loaded on the main body unit, and rotational driving means for rotationally driving the disc holding unit, wherein the disc holding unit has a holding area for the disc-shaped recording medium which is rendered variable depending on the size of the disc-shaped recording medium held therein.

When the small-sized disc is loaded on the disc drive device, the disc holding unit holds the small-sized disc in stability by an area corresponding to the holding area for the small-sized disc, with the rotational driving means running the disc holding unit holding the small-sized disc and hence the small-sized disc in rotation.

When the large-sized disc is loaded on the disc drive device, the disc holding unit holds the large-sized disc in stability by an area corresponding to the holding area for the large-sized disc, with the rotational driving means running the disc holding unit holding the large-sized disc and hence the large-sized disc in rotation.

The disc drive device is preferably provided with detection means for detecting the size of the disc held in the disc holding unit. In this case, the disc holding unit varies the disc holding area depending on the size of the disc detected by the detection means.

In another aspect, the present invention provides a disc drive device including a main body unit of the disc drive device, cartridge holding means mounted for movement relative to the main body unit of the disc drive device and having a plurality of containers for containing the disc cartridges of different sizes therein and movement actuating means for causing movement of the cartridge holding means between a position in which the containers face the outside of the main body unit and a predetermined position inside the main body unit of the disc drive device.

The movement actuating means sets the height position of the cartridge holding means in the main body unit of the disc drive device depending on the size of the disc cartridges contained in the container of the cartridge holding means.

The disc in the disc cartridge held by the cartridge holding means has different height positions depending on the difference in thickness of the disc cartridges. By movement of the cartridge holding means by movement actuating means in the inside of the disc drive device, the discs in the cartridge are positioned at predetermined height positions in the inside of the main body unit of the disc drive device.

The disc drive device is preferably provided with detection means for detecting the size of the disc cartridge accommodated in the container of the cartridge holding means. The movement actuating means sets the height position in the main body unit of the disc drive device of the cartridge holding means depending on the size of the disc cartridge as detected by the detection means.

The disc drive device according to the present invention, in which the disc holding unit for rotatably holding the disc has the outer rim of the holding area for the disc which is variable depending on the size of the disc held therein, can stably hold the discs of different sizes as it secures a sufficient recording area for each disc.

Also, the disc drive device according to the present invention, in which the movement actuating means for causing movement of the cartridge holding means sets the height position of the cartridge holding means in the disc drive device depending on the size of the disc cartridge held in the container of the cartridge holding means, can maintain a constant height position in the main body unit of the disc drive device for the discs contained in the disc cartridges, even if the loaded disc cartridges are of different size, thus appropriately holding these different size discs.

DESCRIPTION OF THE PREFERRED EMBODIMENTS

Figure 1:
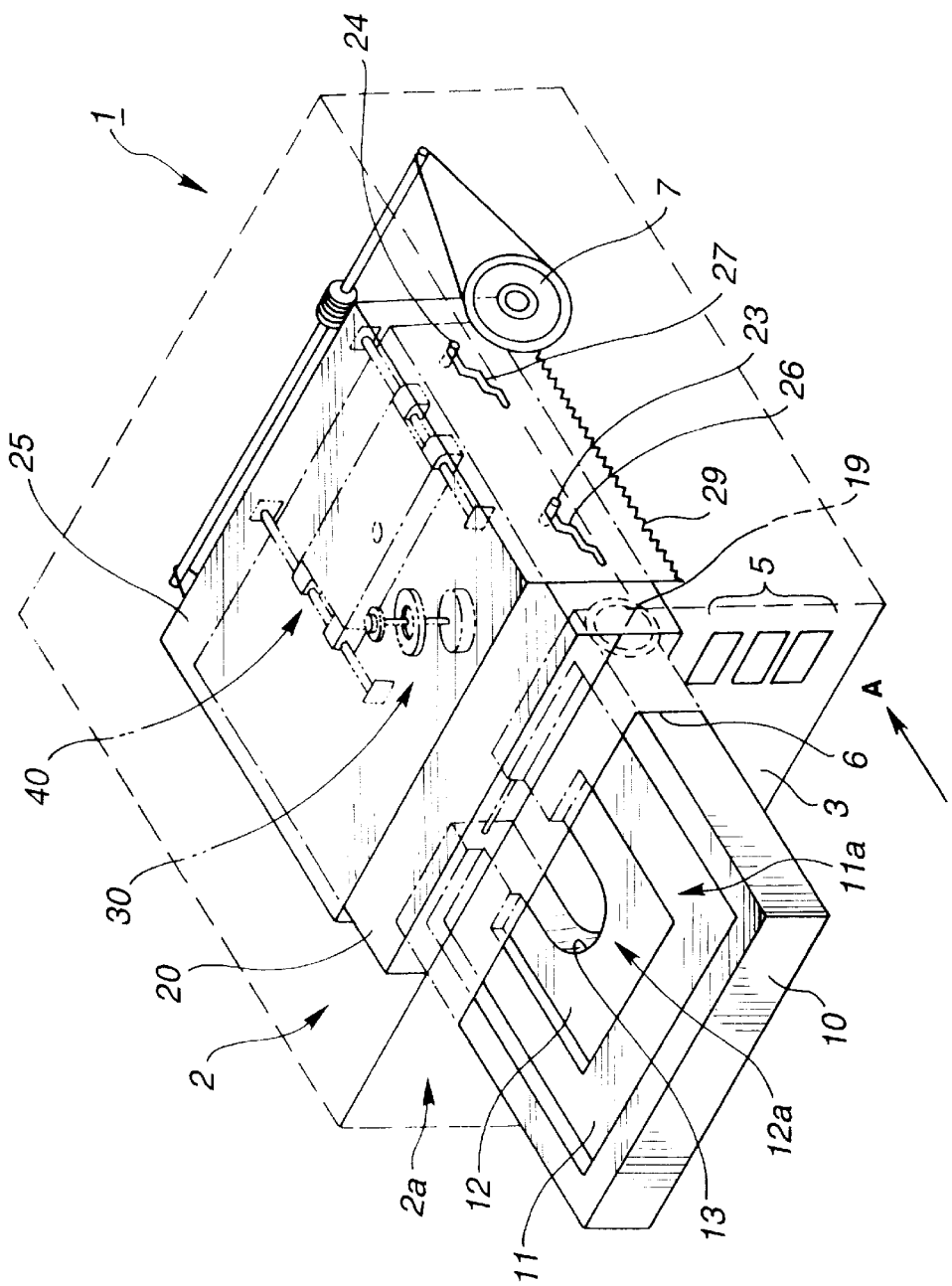
FIG. 1 is a perspective view showing a drive device according to the present invention.

Referring to the drawings, preferred embodiments of the present invention will be explained in detail.

A disc drive device 1 according to the present invention is adapted to cope with two disc cartridges of different sizes holding disc-shaped recording mediums of different sizes. The disc drive device and the disc-shaped recording medium are refereed to herein as a drive device 1 and a disc, respectively. The drive device 1 includes a main body unit 2, a tray 10 mounted for movement relative to the main body unit 2 and adapted for holding the disc cartridge, a spindle motor 30 adapted for rotationally driving a disc in the disc cartridge and an optical head 40 for writing or reading information signals on or from the disc run in rotation by the spindle motor 30, as shown in a perspective view of FIG. 1 and in a schematic view of FIG. 2.

The main body unit 2 of the drive device 1 has a casing 3 of a synthetic resin in the form of a hollow box and a chassis 4 of a press-molded metal plate arranged in the casing 3. The spindle motor 30 is supported on the chassis 4 which movably carries the optical head 40.

The optical head 40 is mounted on the same side as the spindle motor 30 with respect to the disc. The disc is inserted into the main body unit 2 so that its recording surface faces the optical head 40.

Figure 2:
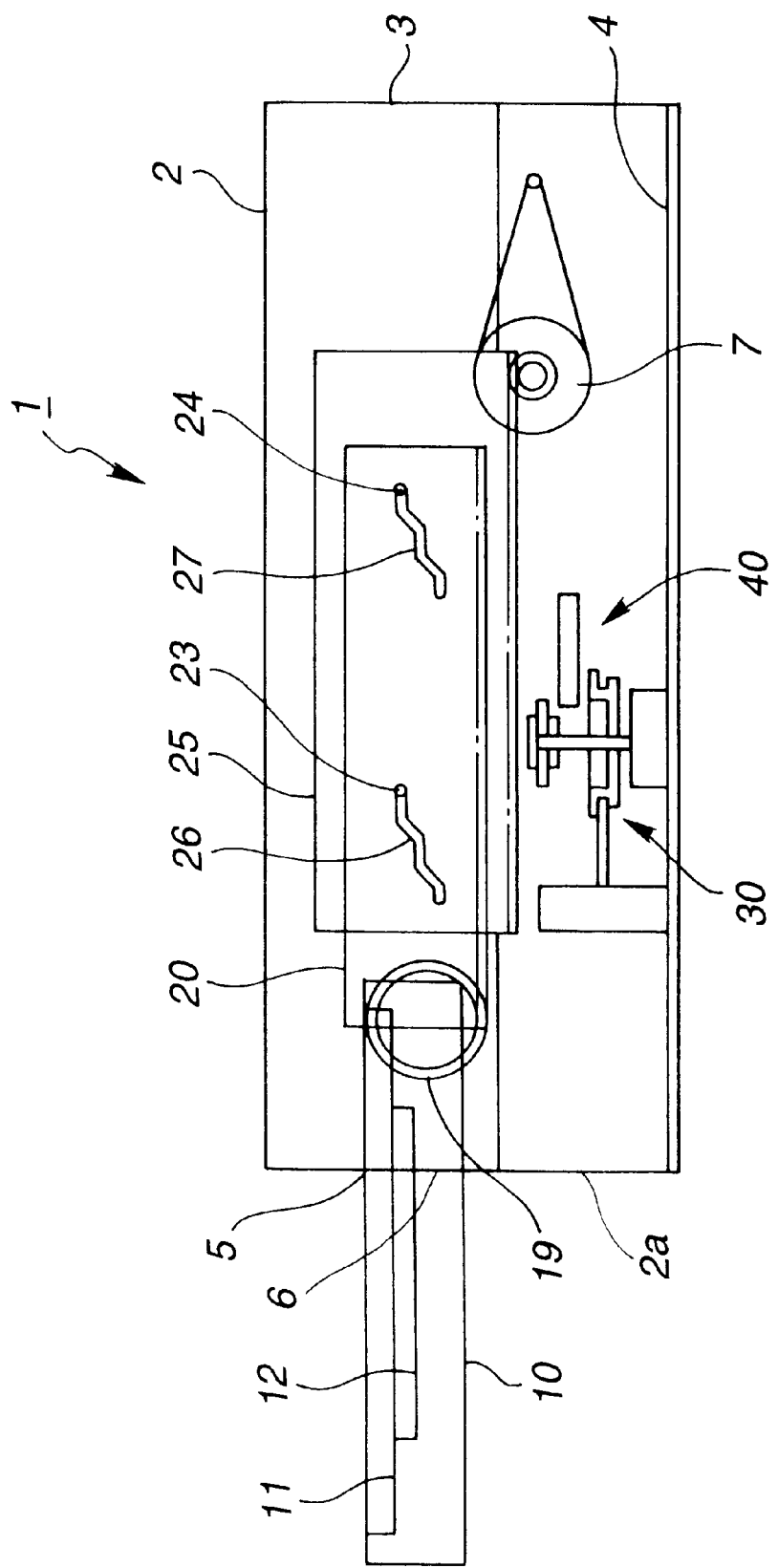
FIG. 2 is a side view showing the drive device.

On the lateral side on the proximal end in the direction of insertion of the disc cartridge of the main body unit 2 as indicated by arrow A in FIG. 1 is mounted an actuating button 5 used by the user actuating the drive device 1. This lateral side is referred to herein as a front surface 2a. In the entire surface 2a of the main body unit 2a of the main body unit 2 is formed an aperture 6 for insertion of the disc cartridge.

The tray 10 is arranged for movement from a defined position in the main body unit 2 via this aperture 6 to a position facing the outer side of the main body unit 2.

Figure 3A:
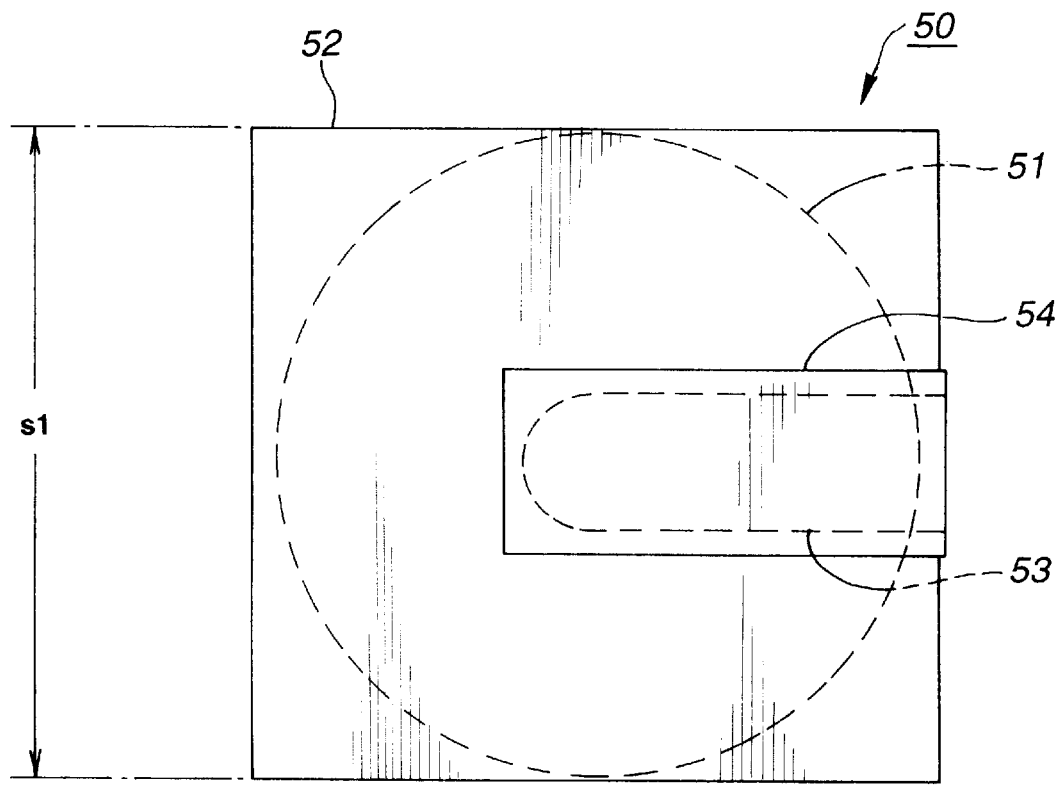
FIGS. 3A and 3B are plan views showing a large-size disc cartridge and a small-sized disc cartridge, respectively.
Figure 3B:
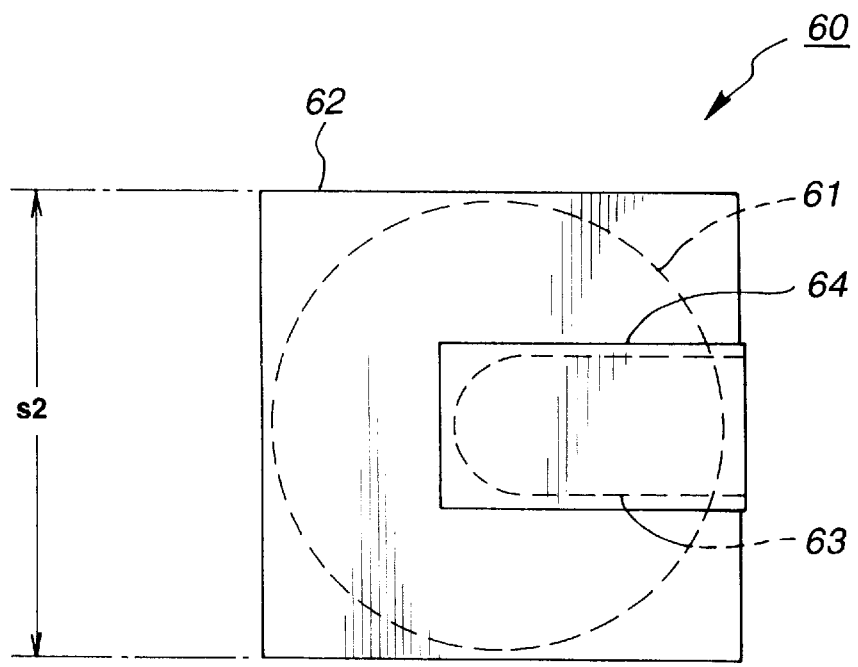
Figure 4A:
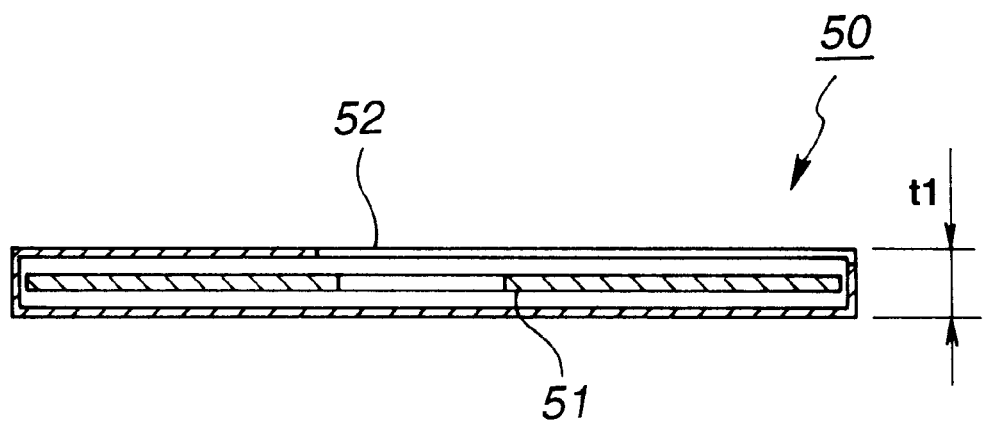
FIGS. 4A and 4B are cross-sectional views showing a large-size disc cartridge and a small-sized disc cartridge, respectively.
Figure 4B:
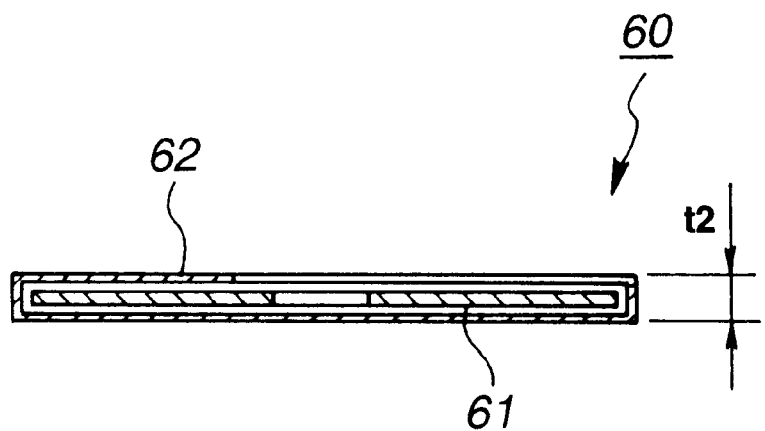

In this tray 10 are housed a large-sized disc cartridge 50, comprised of a large-sized disc 51 held in a main cartridge body unit 52, as shown in FIGS. 3A and 4A, and a small-sized disc cartridge 60, comprised of a small-sized disc 51 held in a main cartridge body unit 62, as shown in FIGS. 3B and 4B.

The main cartridge body unit 52 of the large-sized disc cartridge 50 and a the main cartridge body unit 62 of the small-sized disc cartridge 60 are substantially square-shaped in plan configuration and are of side lengths s1, s2 slightly larger than the diameters of the discs 51, 61 held therein, respectively. Thus, the side s1 of the main cartridge body unit 52 of the large-sized disc cartridge 50 is slightly larger than the side s2 of the main cartridge body unit 62 of the small-sized disc cartridge 60.

The main cartridge body units 52, 62 are formed with apertures 53, 63 for exposing the discs 51, 61 held therein to outside, respectively. When the large-sized disc cartridge 50 and the small-sized disc cartridge 60 are loaded in the drive device 1, the turntable of the spindle motor 30, as later explained, is intruded via apertures 53, 63 into the insides of the main cartridge body units 52, 62 to hold the discs 51, 61 held in the main cartridge body units 52, 62. On the other hand, a light beam of the optical head 40 is illuminated via the apertures 53, 63 on the discs 51, 61, housed in the main cartridge body units 52, 62.

On the main cartridge body units 52, 62 are movably mounted shutter members 54, 64, respectively, for opening/closing the apertures 53, 63, respectively. When the large-sized disc cartridge 50 and the small-sized disc cartridge 60 are not loaded in the drive device 1, the apertures 54, 64 are closed by these shutter members 54, 64.

The large-sized disc cartridge 50 has a thickness t1 larger than the thickness t2 of the small-sized disc cartridge 60.

Figure 5:
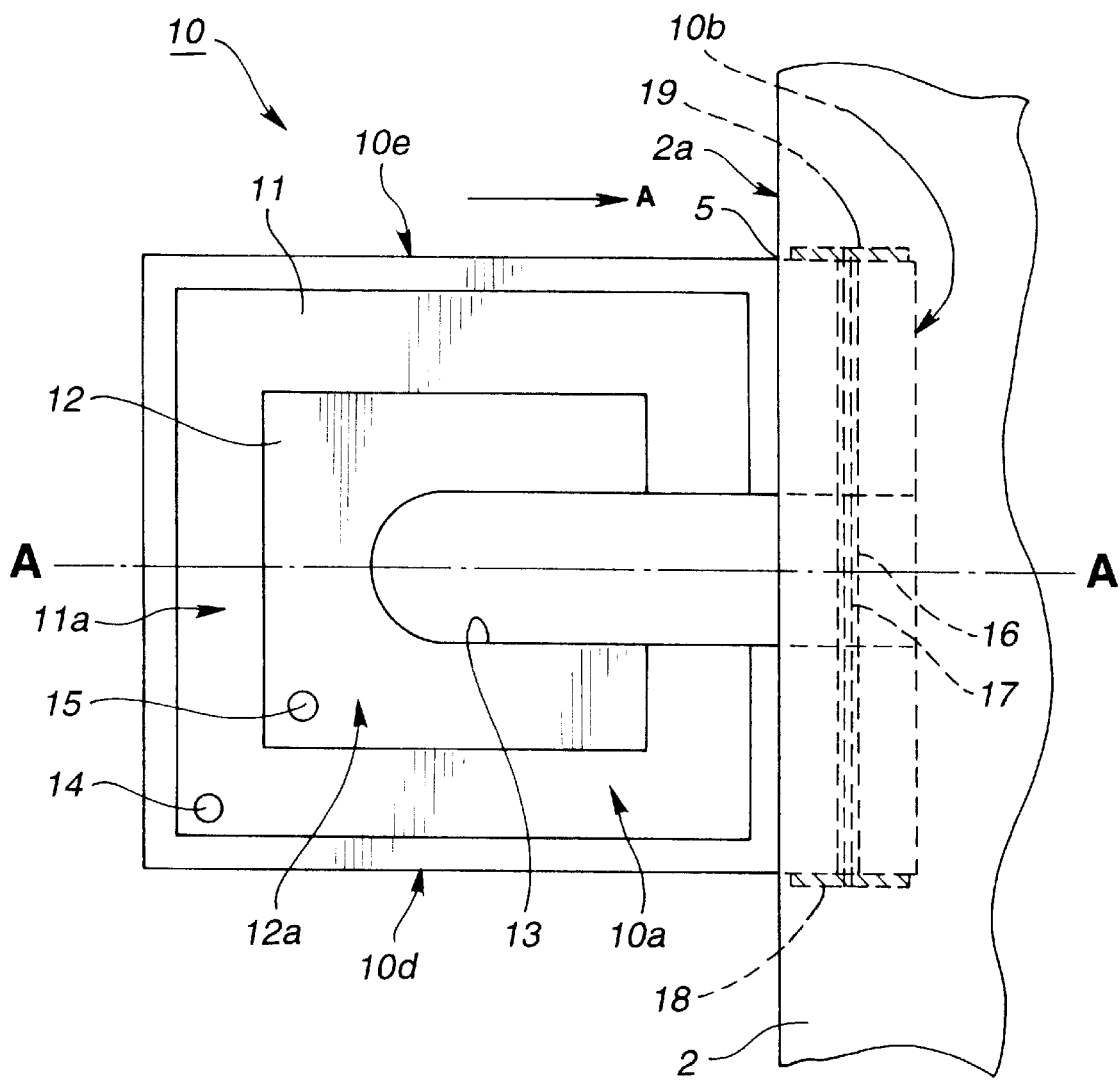
FIG. 5 is a plan view showing a tray.
Figure 6:
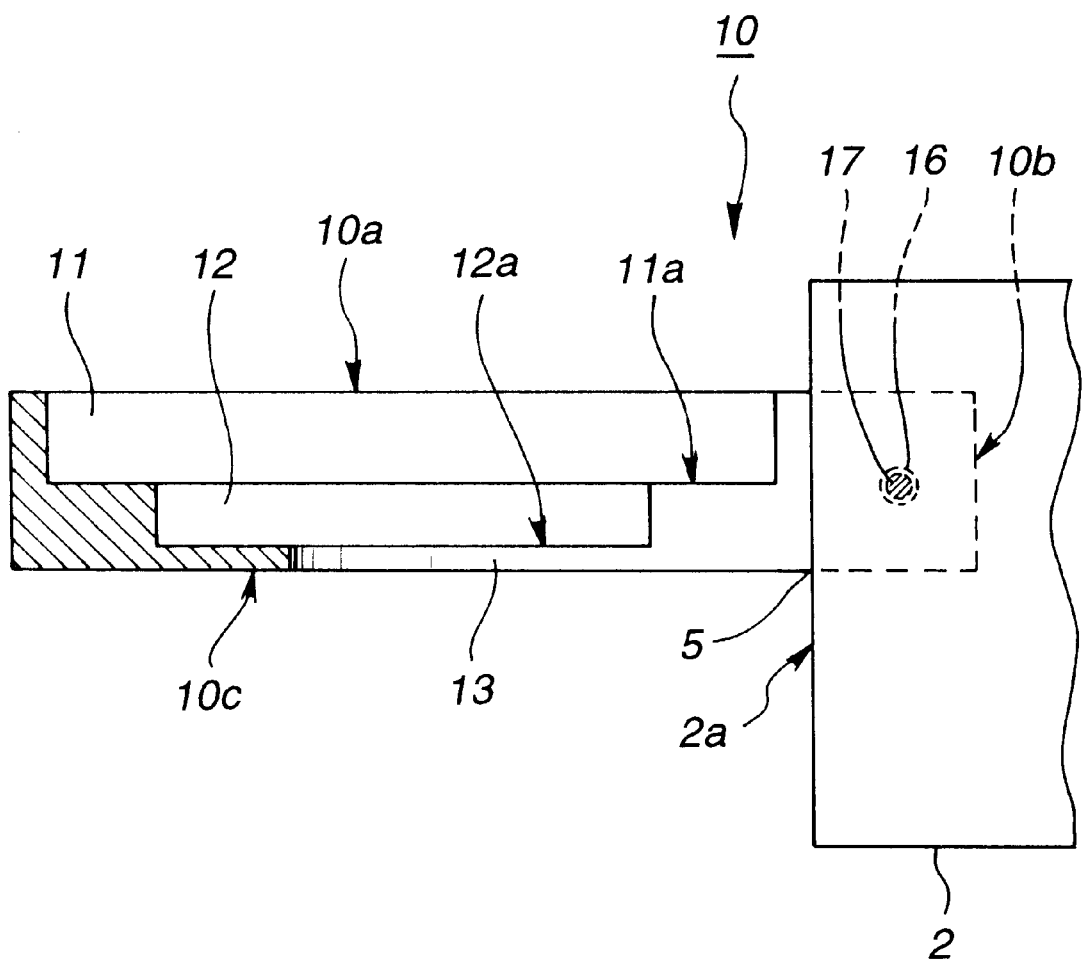
FIG. 6 is a cross-sectional view along line A—A in FIG. 5.

The tray 10 is molded from a spindle motor to a rectangular plate, as shown in the plan view of FIG. 5 and in a cross-sectional view of FIG. 6. In a major surface 10a are formed a first containing recess 11 for holding the large-sized disc cartridge 50 and a second containing recess 12 for holding the small-sized disc cartridge 60.

The first containing recess 11 and the second containing recess 12 are formed in the major surface 10a of the tray so that center points of cartridge setting surfaces 11a, 12a thereof coincide with each other. From the center points of the cartridge setting surfaces 11a, 12a of the first containing recess 11 and the second containing recess 12 of the tray 10 towards the distal ends in the inserting direction of the disc cartridge 10 (proximal ends 10b of the tray 10) indicated by arrow A in FIG. 5 is formed an aperture 13 for opening the first and second containing recesses 11, 12 towards the bottom side 10c of the tray 10.

This aperture 13 conforms in profile to the apertures 53, 63 formed in the disc cartridges 50, 60 held in the first and second recesses 11, 12. When the disc cartridges 50, 60 are held in the first and second recesses 11, 12 and are loaded in this state in the drive device 1, the turntable of the spindle motor 30 as later explained holds the discs 51, 61 via the aperture 13 and the apertures 53, 63 in the disc cartridges 50, 60, at the same time as a light beam of the optical head is illuminated via the aperture 13 and the apertures 53, 63 in the disc cartridges 50, 60 on the discs 51, 61.

Preferably, first and second detection means 14, 15 are provided in the cartridge setting surface 11a of the first containing recess 11 and in the cartridge setting surface 12a of the second containing recess 12 on the tray 10.

The first and second detection means 14, 15 are comprised of, for example, micro-switches and, when the large-sized disc cartridge 50 is held in the first containing recess 11, the second detection means 14 is thrust to detect that the large-sized disc cartridge 50 has been housed in the first containing recess 11. Also, when the small-sized disc cartridge 60 is held in the second containing recess 12, the second detection means 15 is thrust to detect that the small-sized disc cartridge 60 has been housed in the second containing recess 12. The first and second detection means 14, 15 may also be reflection type photo interrupters in place of the micro-switches. This reflection type photointerrupter has a light emitting portion and a light receiving portion and is designed so that possible presence of a light reflecting member, herein a disc cartridge, can be detected depending on whether or not the light emitted by the light-emitting portion is reflected and received by the light receiving section.

On the side of the proximal end 10b of the tray 10 is formed a through-hole 16 extending from a lateral side 10d of the tray 10 parallel to the disc cartridge inserting direction to its opposite side lateral surface 10e. In the through -hole 16 is inserted a shaft 17.

On both ends of the shaft 17, projected outwards from left and right sides 10d, 10e of the tray 10, are carried gears 18 and 19, which are coupled via shaft 17 to a motor, not shown, so that the gears are run in rotation in the same direction as that of rotation of the motor.

The tray 10 is connected via this gears 18 and 19 to a tray holder 20 arranged within the main body unit 2 of the drive device 1.

The tray holder 20 is formed by warping a metal plate or the like and includes a top plate 20a, first and second sidewall sections 20b, 20c perpendicular to the top plate 20a, first and second folded portions 20d, 20e formed by bending the ends of the sidewall sections 20b, 20c inwardly of the tray holder 20, and first and second upstanding sections 20f, 20g upstanding from the first and second folded portions 20d, 20e towards the top plate 20a.

Figure 7:
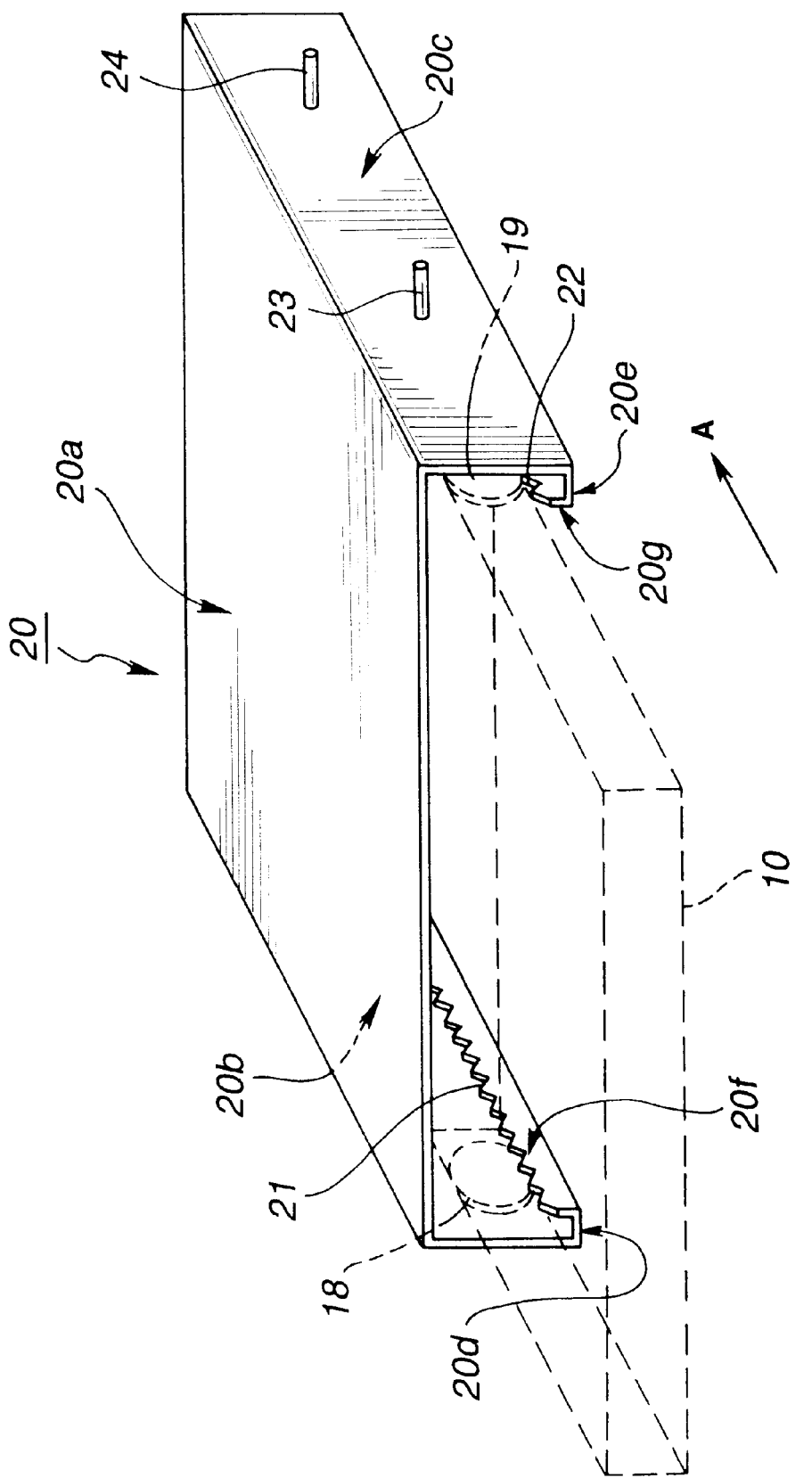
FIG. 7 is a perspective view showing a tray holder.

The first and second upstanding sections 20f, 20g of the tray holder 20 are formed with racks 21, 22 extending along the disc cartridge loading direction indicated by arrow A in FIG. 7. The tray 10 is formed with first and second gears 18, 19 which are engaged with the racks 21, 22, respectively, so that the tray 10 is held by the tray holder 20 for movement from a defined position in the tray holder 20 to a position facing the outer side of the tray holder 20.

On each of the first and second sidewall sections 20b, 20c of the tray holder 20 are mounted upright a pair of tray holder supporting pins 23, 24, respectively. In FIG. 7, only paired tray holder supporting pins 23, 24 mounted on the second sidewall section 20c are shown. The tray holder 20 is supported via these paired tray holder supporting pins 23, 24 by a cam member 25 movably mounted in the main body unit 2 of the drive device so that the tray holder 20 is moved along the height, that is in a direction into and out of contact with the spindle motor 30, with movement of the cam member 25.

Figure 8:
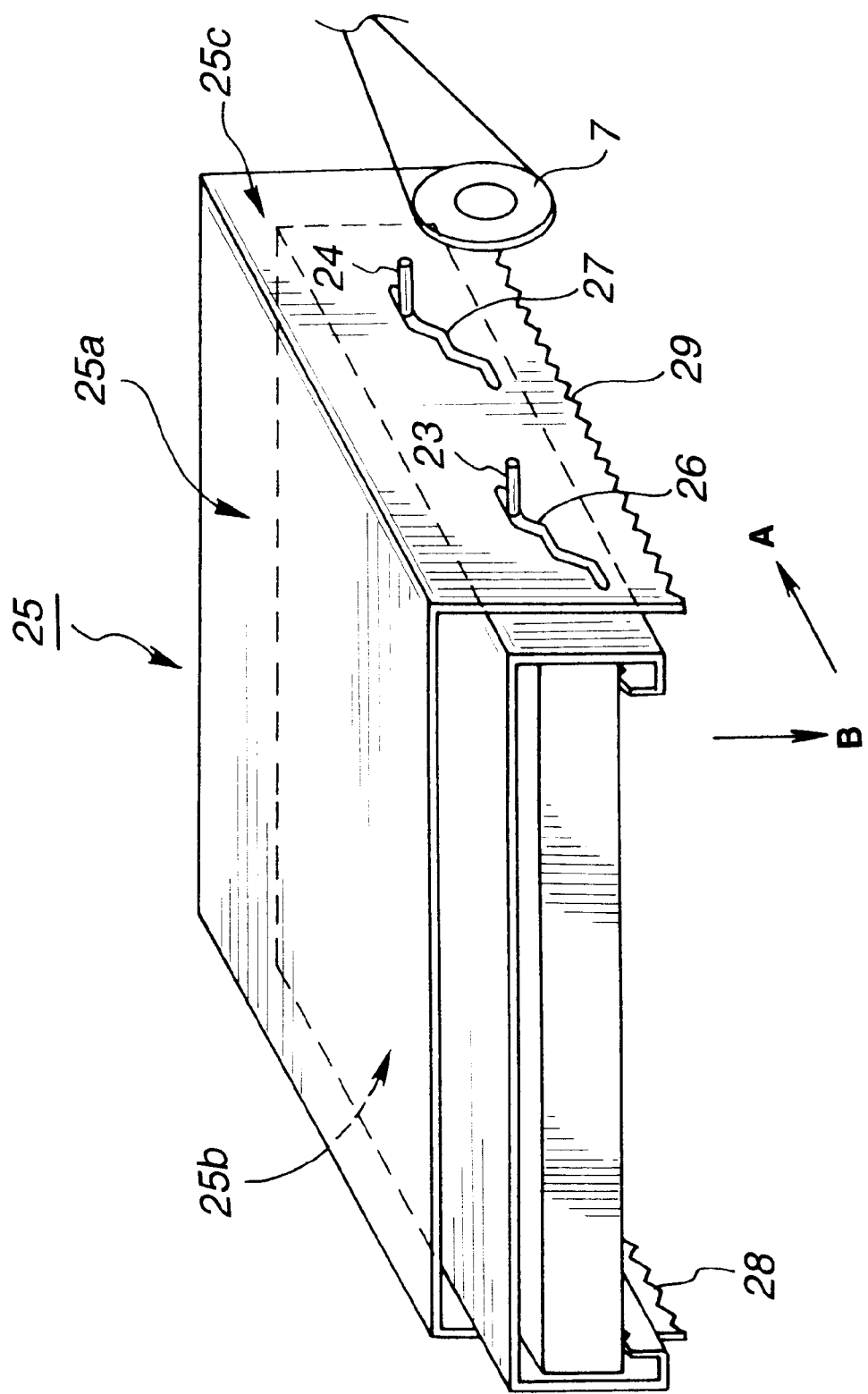
FIG. 8 is a perspective view showing a cam member.

Referring to FIG. 8, the cam member 26 is formed by warping a metal plate, and is made up of a top plate 25a and first and second sidewall sections 25b, 25c extending at right angles to the top plate 25a. The first and second sidewall sections 25b, 25c are formed with a pair of cam grooves 26, 27 into which are inserted paired tray holder supporting pins 23, 24 provided on the first and second sidewall sections 20b, 20c of the tray holder 20 to set the height positions of the tray holder 20 and the tray 10 connected to this tray holder 20. In FIG. 8, only the paired cam grooves 26, 27 formed in the second sidewall section 25c are shown.

The lower ends of the first and second sidewall sections 25b, 25c are formed with racks 28, 29, respectively, for extending along the disc cartridge inserting direction shown by arrow A in FIG. 8. These racks 28, 29 are connected to a pair of gears 7 mounted on the chassis 4 of the main body unit 2 and which are connected to a motor, not shown. Thus, the cam member 25 is moved along the disc cartridge inserting direction with motor rotation.

Figure 9:
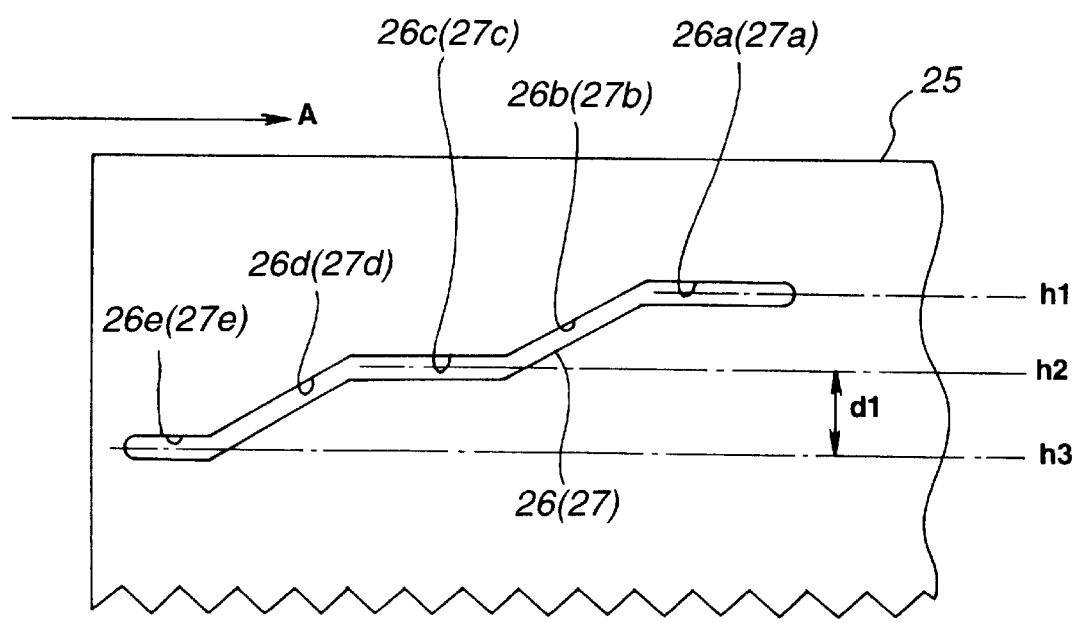
FIG. 9 is an enlarged side view showing essential portions of the cam member.

Referring to FIG. 9, the paired cam groove 26 (27) includes a first horizontal groove 26a (27a) extending parallel to the disc cartridge inserting direction indicated by arrow A in FIG. 9, and a first inclined groove 26b (27b) inclined at a defined angle relative to the disc cartridge inserting direction. The paired cam groove 26 (27) also includes a second horizontal groove 26c (27c) communicating with the first inclined groove 26b (27b) and which extends parallel to the disc cartridge inserting direction, and a second inclined groove 26d (27d) communicating with the second horizontal groove 26d (27d) and which is inclined at an angle to the disc cartridge inserting direction The paired cam groove 26 (27) further includes a third horizontal groove 26e (27e) communicating with the second inclined groove 26d (27d) and which is provided parallel to the disc cartridge inserting direction.

In the initial state, that is in a state in which the tray 10 holding the disc cartridge has been moved into the inside of the tray holder 20, the paired tray holder supporting pins 23, 24 provided on the first and second sidewall sections 20b, 20c of the tray holder 20 are supported by the lateral edges of the first horizontal groove 26a of the cam grooves 26, 27.

The tray holder 20 and the tray 10 held therein are positioned at this time at a first height position h1 in the interior of the main body unit 2 of the drive device 1.

When the cam member 25 is moved along the disc cartridge inserting direction, the paired tray holder supporting pins 23, 24 are moved along the first inclined groove 26b (27b) along the direction of height shown by arrow B in FIG. 8 so that the tray holder supporting pins 23, 24 are supported by the lateral edges of the second horizontal groove 26c.

At this time, the tray holder 20 and the tray 10 in the tray holder 20 are positioned at a second height position h2 in the inside of the main body unit 2 of the drive device 1.

If the cam member 25 is further moved in the disc cartridge inserting direction, the paired tray holder supporting pins 23, 24 are moved in the height-wise direction along the second inclined groove 26d (27d) until it is supported by the lateral edge of the third horizontal groove 26e (27e).

At this time, the tray holder 20 and the tray 10 in the tray holder 20 are positioned at a third height position h2 in the inside of the main body unit 2 of the drive device 1.

Meanwhile, the above-mentioned cam groove 26 (27) is designed so that a difference d1 between the second height position h2 and the third position h3 will be equal to a difference between the height position of the large-sized disc 51 when the latter is held in the tray 10 and the height position of the small-sized disc 61 when the latter is held in the tray 10. By designing the cam groove 26 (27) in this manner, it is possible with the drive device 1 to maintain the height position of the disc in the main body unit 2 of the drive device 1 at a constant height position irrespective of which of the large-sized disc cartridge 50 or the small-sized disc 61 is held in the tray 10.

Figure 10:
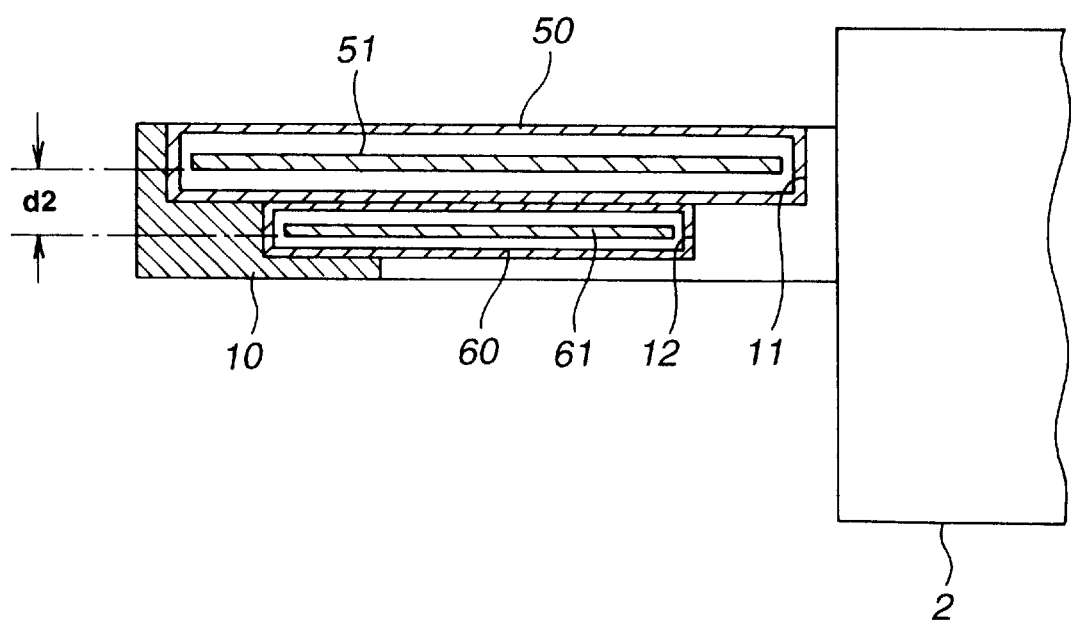
FIG. 10 is a cross-sectional view showing a tray holding a disc cartridge.

That is, since the second containing recess 12 for holding the small-sized disc cartridge 60 is further recessed from the bottom surface 11*a* of the first containing recess 11 adapted for holding the large-sized disc cartridge 50, and the small-sized disc cartridge 60 is thinner in thickness than the large-sized disc cartridge 50, the disc height position in the tray 10 when the large-sized disc cartridge 50 is held in the tray 10 differs by d2 in FIG. 10 from that when the small-sized disc cartridge 60 is held in the tray 10.

Thus, in order for the spindle motor 30 to hold these discs appropriately in order to run the discs in rotation, it is necessary to maintain the constant height of the discs in the main body unit 2 of the drive device 1 by adjusting the height position of the tray 10 in the main body unit 2 of the drive device 1 both when the large-sized disc cartridge 50 is held in the tray 10 and when the small-sized disc cartridge 60 is held therein.

If the large-sized disc cartridge 50 is held in the tray 10 of the drive device 1, the cam member 25 is moved a pre-set amount in order to position the tray 10 and the tray holder 20 at a third height position h3. If the small-sized disc cartridge 60 is held in the tray 10 of the drive device 1, the cam member 25 is moved a pre-set amount in order to position the tray 10 and the tray holder 20 at a third height position h3. The drive device 1 is designed so that the difference d1 between the second height position h2 and the third height position h3 will be equal to the difference d2 between the height position of the large-sized disc 51 when the large-sized disc cartridge 50 is held in the tray 10 and the height position of the large-sized disc 51 when the large-sized disc cartridge 50 is held in the tray 10 in order to maintain a constant height of the respective discs in the main body unit 2 of the drive device 1.

On an axial line within the main body unit 2, on which are disposed center positions of the discs 51, 61 held in the disc cartridges 50, 60 in the tray 10 when the tray 10 is positioned at the second position h2 or at the third position h3, there is arranged the spindle motor 30 supported by the chassis 4. When the tray 10 is positioned at the second position h2 or at the third position h3, the discs 51, 61 held in the disc cartridges 50, 60 in the tray 10 are held and run in rotation by the spindle motor 30 when the tray 10 is positioned at the second position h2 or at the third position h3.

Figure 11:
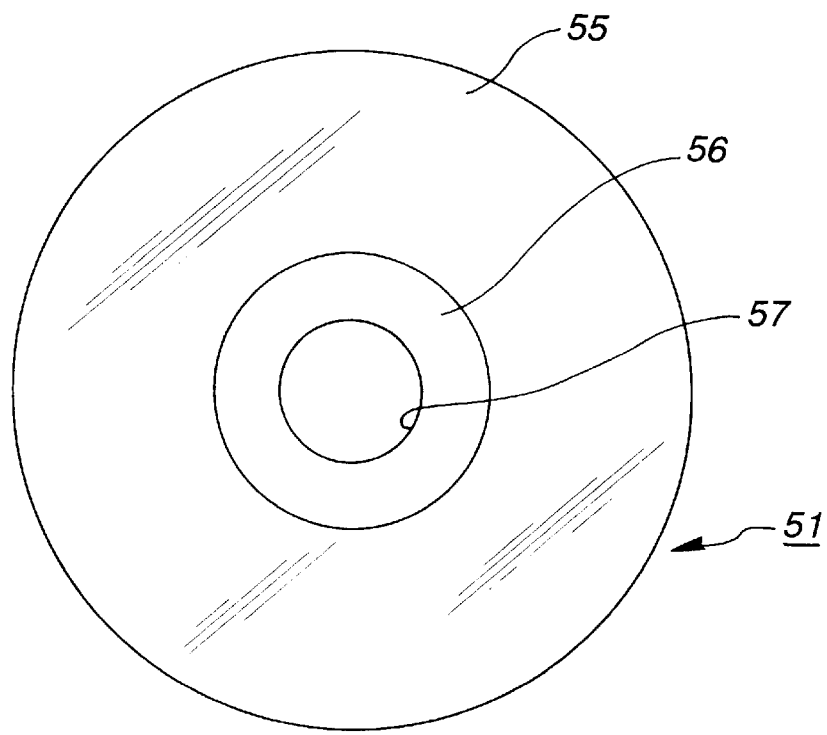
FIG. 11 is a plan view showing a large-sized disc.
Figure 12:
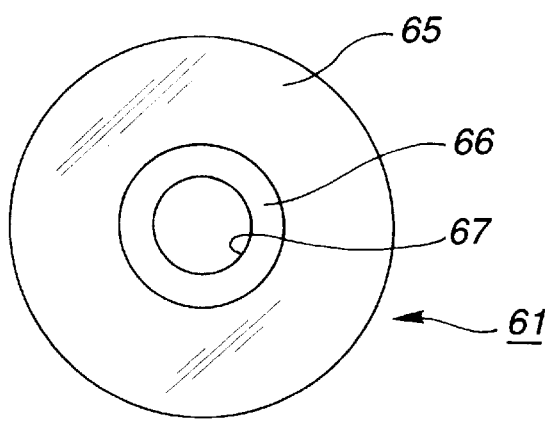
FIG. 12 is a plan view showing a small-sized disc.

It should be noted that the discs 51, 61 held within the disc cartridges 50, 60, respectively, are provided with recording areas 55, 65 for recording information signals, and with areas gripped by the spindle motor 30 (holding areas 56, 68), as shown in FIGS. 11 and 12. The holding areas 56, 66 are provided on the radially inner side, that is in adjacency to the center holes 57, 67 of the discs 51, 61.

The holding area 56 of the large-sized disc 51 housed in the large-sized disc cartridge 50 and the holding area 66 of the small-sized disc 61 housed in the small sized sized disc cartridge 60 are selected to be optimum depending on the disc size in order to maintain a sufficient recording area and the stable holding state for the discs 51, 61.

The spindle motor 30 of the drive device 1 of the present invention is designed so that the turntable size will be variable depending on the size of the discs 51, 61, that is on the sizes of the holding areas 56, 66 of the discs 51, 61.

Figure 13:
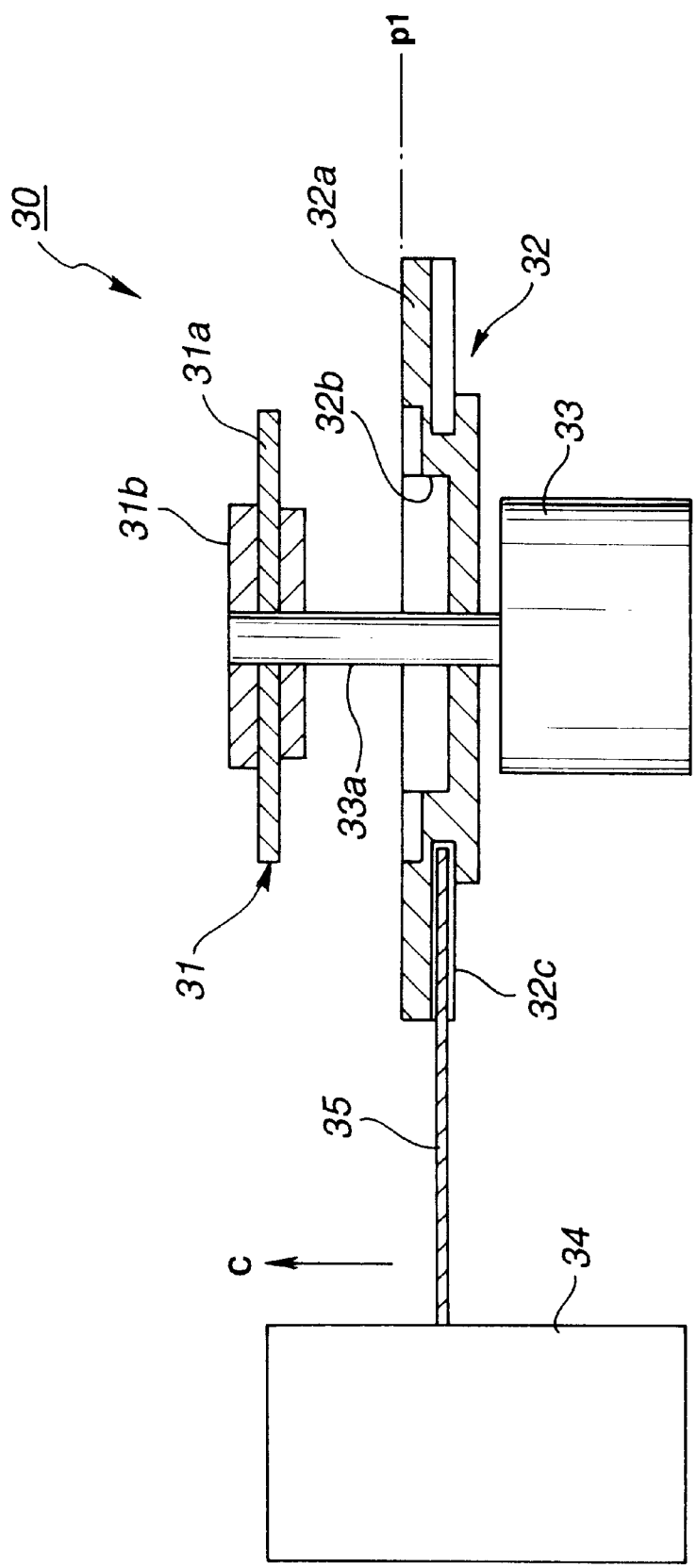
FIG. 13 is a partial cross-sectional view showing a spindle motor.
Figure 14:
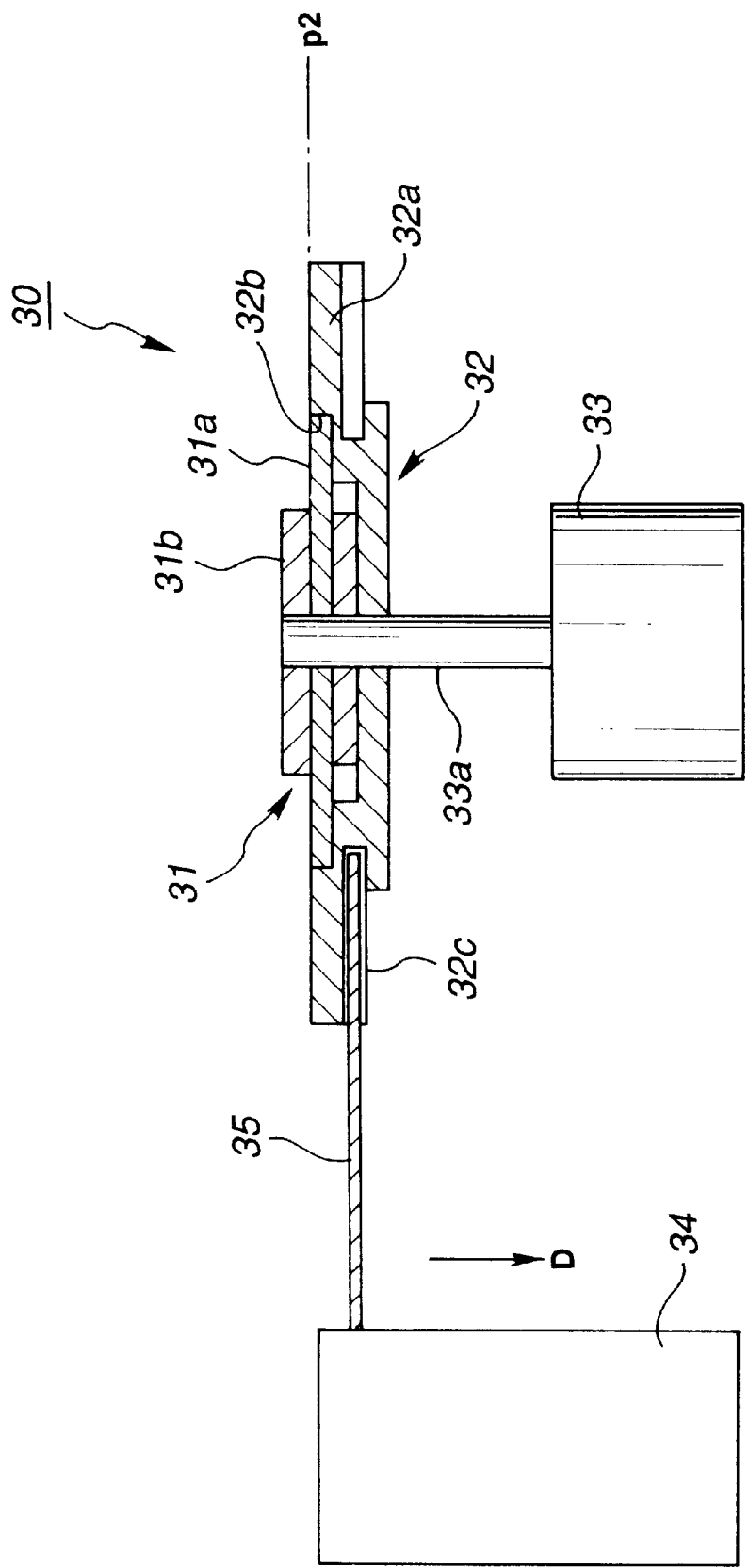
FIG. 14 is a partial cross-sectional view of the spindle motor.

Referring to FIGS. 13 and 14, this spindle motor 30 includes a first turntable 31, associated with the small-sized disc 61, a second turntable 32, associated with the large-sized disc 51, and a motor 33 for rotating the first and second turntables 31, 32, with the second turntable 32 being mounted between the first turntable 31 and the motor 33.

The first turntable 31 has a disc setting portion 31*a* in register with the holding area 66 of the small-sized disc 61, and a fitting protrusion 31*b*, at the center of the disc setting portion 31*a*, profiled to conform to the center hole 67 of the small-sized disc 61.

The mid portion of the first turntable 31 is passed through by a rotary shaft 33*a* of the motor 33 so that the first turntable 31 is rotated with driving of the motor 33.

The second turntable 32 has a disk setting portion 32*a* profiled to conform to the holding area 56 of the large-sized disc 51. At a mid portion of the disk setting portion 32*a* is formed a recess 32*b* profiled to conform to the lower end of the first turntable 31.

The mid portion of the second turntable 32 is passed through by the rotary shaft 33*a* of the motor 33 so that the second turntable 32 is rotated with driving of the motor 33.

The lateral surface of the second turntable 32 is formed with a groove 32*c* extending in a perpendicular direction relative to the axis of the rotary shaft 33*a* of the motor 33. In this groove 32*c* is fitted a movement actuating plate 35 of a vertical movement mechanism 34.

When fed with a predetermined signal, the vertical movement mechanism 34 causes movement of the movement actuating plate 35 in the direction indicated by arrow C in FIG. 13 or in the direction indicated by arrow D in FIG. 14 to shift the second turntable 32 to a first position p1 or to a second position p2.

With the above-described structure of the spindle motor 30, if a signal specifying that the large-sized disc cartridge 50 has been held in the tray 10 is sent to the vertical movement mechanism 34, the latter causes movement of the movement actuating plate 35 in the direction indicated by arrow C. With the movement of the movement actuating plate 35, the second turntable 32 is moved in the direction indicated by arrow C for positioning the second turntable 32 at the second position p2.

At this time, the lower end of the first turntable 31 is accommodated in the recess 32*b* provided in the second turntable 32 to unify together the first turntable 31 and the second turntable 32. There is formed a turntable having a disc setting portion sized in conformity to the holding area 56 of the large-sized disc 51 to hold the large-sized disc 51 in stability.

Also, if the signal specifying that the small-sized disc cartridge 60 has been held on the tray 10 is sent to the vertical movement mechanism 34 of the spindle motor 30, the vertical movement mechanism 34 causes movement of the movement actuating plate 35 in the direction indicated by arrow D. With movement of the movement actuating plate 35, the second turntable 32 is moved in the direction indicated by arrow D to position the second turntable 32 at the first position p1. The small-sized disc 61 is held on the first turntable 31.

When the second turntable 32 is at the first position p1, the first turntable 31 and the second turntable 32 are preferably spaced apart from each other a distance larger than the thickness of the optical head 40. By setting the distance between the first turntable 31 and the second turntable 32 when the second turntable 32 is positioned at the first position p1 in this manner, the inner rim side of the recording area 65 of the small-sized disc cartridge 60 can be accessed without producing such an inconvenience of the optical head 40 colliding against the second turntable 32.

Figure 15:
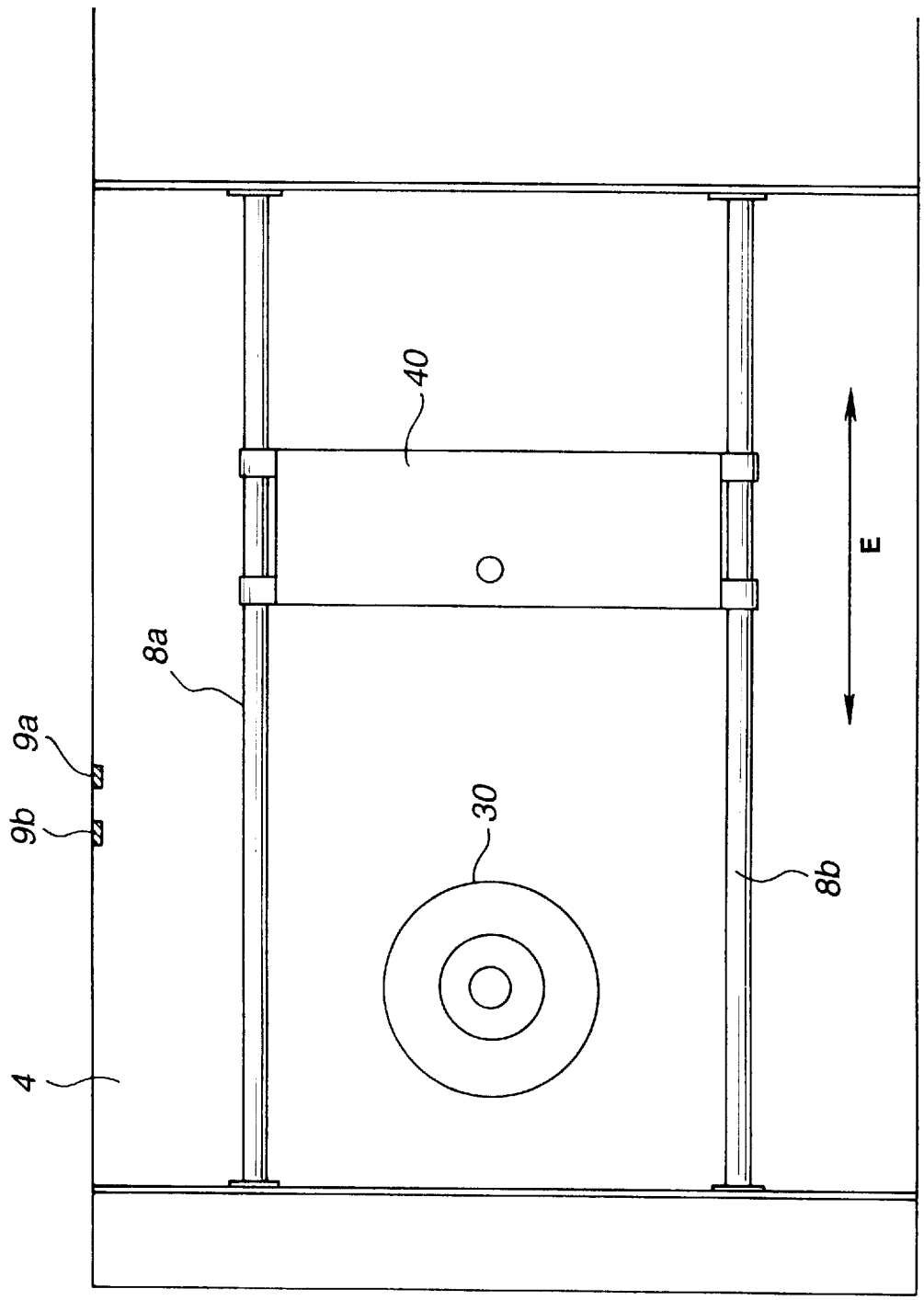
FIG. 15 is a plan view showing the spindle motor and an optical head.

The optical head 40 is supported by a pair of shafts 8a, 8b mounted on the chassis 4 and is arranged in the main body unit 2 for movement radially of the disc, as indicated by arrow E in FIG. 15. The optical head 40 illuminates a light beam to the optical disc, held by the spindle motor 30 and which is run in rotation, as the optical head is moved radially of the disc. Alternatively, the optical disc detects the light reflected from the disc to read out signals recorded on the disc.

The chassis 4 preferably includes detection means 9a, 9b, employing a reflection type photointerrupter or a microswitch, for detecting the lead-in position of the large-sized disc 51 or the small-sized disc 61 held by the spindle motor 30. By providing the chassis 4 with the detection means 9a, 9b for detecting the lead-in position of the disc, it is possible for the optical head 40 to access the lead-in position promptly even with variable sizes of the disc held by the spindle motor 30. For immobilizing the disc on the turntable, it is possible to clamp the disc with respect to the turntable by clamp means, not shown, or to provide a metal piece and a magnet on the holding area of the disc or on the turntable, respectively, by way of magnetic immobilization.

The operation of the drive device 1, constructed as described above, is hereinafter explained.

When the large-sized disc cartridge 50 is housed in the tray 10, and the actuating button 5 is thrust, the motor and the gear 19 mounted on the motor are run in rotation. The tray, 10 is moved onto the tray holder 20.

When the tray 10 is moved onto the tray holder 20, the gear 7 meshing with the racks 29, 30 formed on the cam member 25 is run in rotation for moving the cam member 25 in the disc cartridge inserting direction. If the cam member 25 is moved in this manner, the tray holder supporting pins 23, 24 inserted into the cam grooves 26, 27 are run in rotation so that the cam member 25 is moved in the disc cartridge inserting direction. When the cam member 25 is moved, the tray holder supporting pins 23, 24, inserted into the cam grooves 26, 27, are varied in their height-wise positions, along the cam grooves 26, 27, for positioning the tray holder 20 and the tray 10 held therein in the main body unit 2 of the drive device 1.

The amount of movement of the cam member 25 is set in dependence upon the size of the disc cartridge in the tray 10, such that, if the large-sized disc cartridge 50 is held in the tray 10, the cam member 25 is moved a distance corresponding to the length of the cam grooves 26, 27 in the disc cartridge inserting direction. Thus, the tray holder 20 and the tray 10 therein are moved in the inside of the main body unit 2 from the first height-wise position h1 to the third height-wise position h3 and is positioned at the latter position h3.

Also, if a signal specifying that the large-sized disc cartridge 50 has been accommodated in the tray 10 is sent to the vertical movement mechanism 34, the movement actuating plate 35 is moved by the vertical movement mechanism 34 to move the second turntable 32 to the second position p2.

When moved in this manner to the second position p2, the second turntable 32 is unified with the first turntable 31 to constitute a turntable having a disc setting portion corresponding in size to the holding area 56 of the large-sized disc 51. The spindle motor 30 holds the large-sized disc 51 in the large-sized disc cartridge 50 by this turntable to run the disc in rotation in stabilized state.

The optical head 40 illuminates a light beam on the rotating large-sized disc 51 to record or read out information signals on or from the large-sized disc 51.

If the small-sized disc cartridge 60 is loaded on the tray 10, and the actuating button 5 is thrust, the motor provided on the tray 10 and the gear 19 connected to this motor are run in rotation so that the tray 10 is moved in the tray holder 20.

When the tray 10 is moved in the tray holder 20, the gear 7 meshing with the racks 28, 29 formed on the cam member 25 is run in rotation to move the cam member 25 in the disc cartridge inserting direction. When the cam member 25 is moved, the tray holder supporting pins 23, 24 inserted into the cam grooves 26, 27 are varied in their height-wise positions, along the cam grooves 26, 27, for positioning the tray holder 20 and the tray 10 therein in the main body unit 2 of the drive device 1.

At this time, the cam member 25 is moved a distance corresponding to the lengths of the first horizontal groove 26a (27a) and the fist inclined groove 26b (27b). Thus, the tray holder 20 and the tray 10 held therein are moved in the inside of the main body unit 2 of the drive device 1 from the first height position h1 to the second height position h2 so as to be positioned at the latter position h2.

When a signal specifying that the large-sized disc cartridge 60 has been loaded in the tray 10 is sent to the vertical movement mechanism 34, the latter causes the movement actuating plate 35 to be moved to shift the second turntable 32 to the first position p1.

By the second turntable 32 being moved to the first position p1, the first turntable 31 is separated from the second turntable 32 to constitute a turntable having the disc setting portion 31a sized to mate with the holding area 66 of the small-sized disc 61. The spindle motor 30 holds the small-sized disc 61 in the small-sized disc cartridge 60 in stability to hold and rotate the small-sized disc 61 in the small-sized disc cartridge 60.

The optical head 40 illuminates a light beam on the rotating small-sized disc 61 to record or read out information signals on or from the small-sized disc 51.

The drive device 1 of the present invention sets the height position in the main body unit 2 of the tray 10 responsive to the size of the disc cartridge held in the tray 10, so that these discs can be held appropriately no matter whether information signals are written on or read out from the large-sized disc 51 or the small-sized disc 61.

With the drive device 1 according to the present invention, since the outer size of the disc setting portion of the turntable is varied responsive to the size of the loaded disc, these discs can be held in stability, while a sufficient recording area is secured for these discs, no matter whether information signals are written or read out from the large-sized disc 51 or the small-sized disc 61.

The above description is directed to a drive device 1 in which the spindle motor 30 has the first turntable 31 associated with the small-sized disc 61 and the second turntable 32 associated with the large-sized disc 51, and in which, if the disc loaded is the large-sized disc 51, the first turntable 31 and the second turntable 32 are unified together to hold the large-sized disc 51 appropriately, whereas, if the disc loaded is the small-sized disc 61, the first turntable 31 holds the small-sized disc 61 appropriately. However, with the spindle motor of the drive device according to the present invention, it suffices if the turntable size is variable depending on the size of the disc loaded thereon. Thus, the spindle motor may be constructed as shown in FIGS. 16 and 17.

Figure 16A:
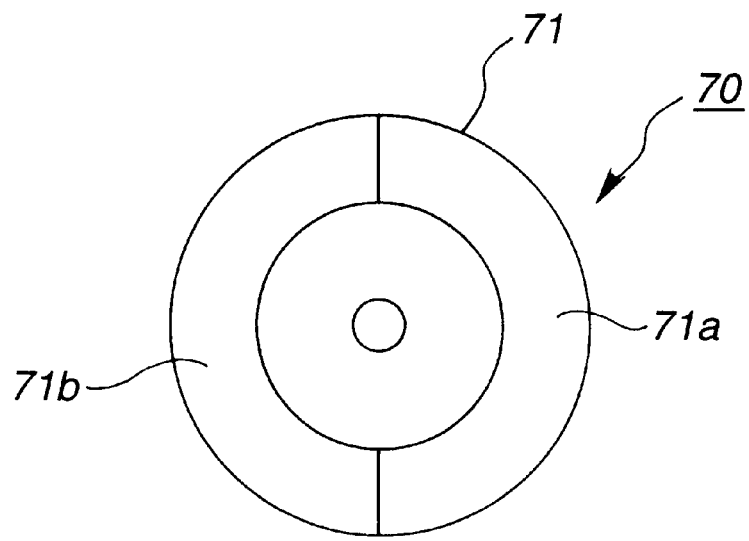
FIGS. 16A and 16B are plan views showing the state of another spindle motor for a small-sized disc and that for a large-size disc, respectively.
Figure 16B:
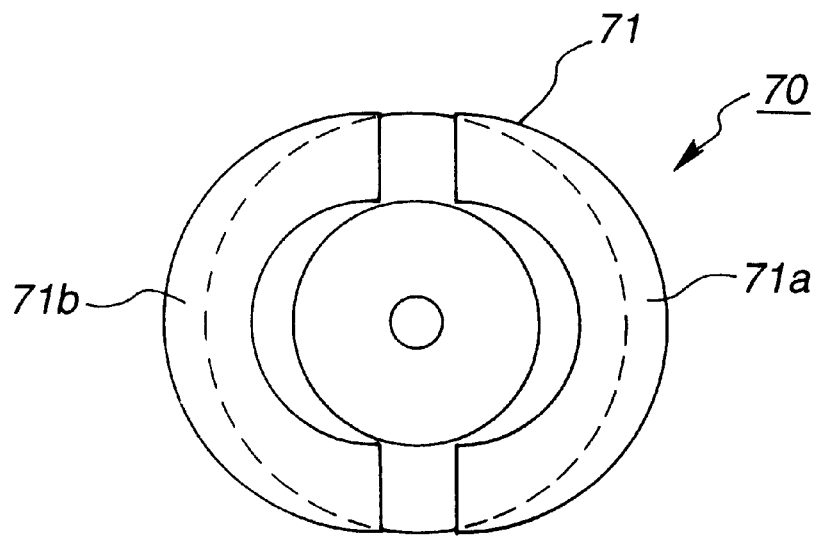
Figure 17A:
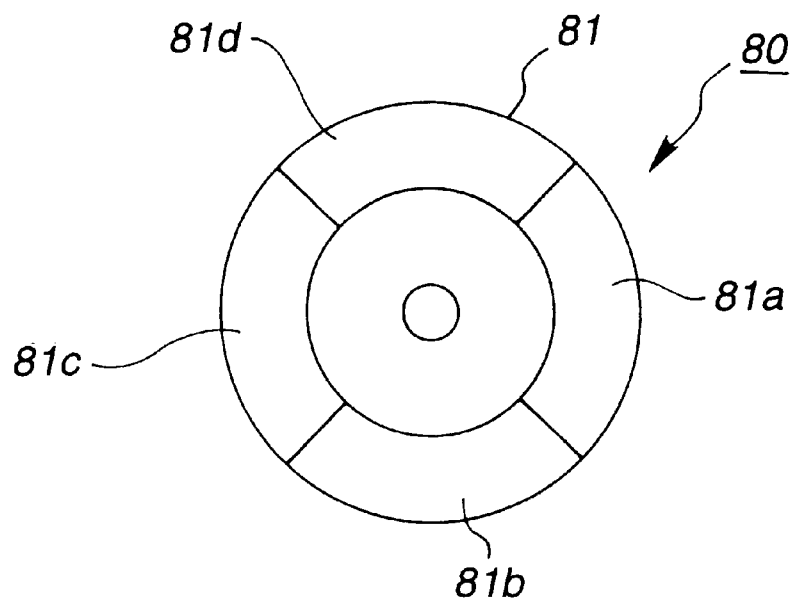
FIGS. 17A and 17B are plan views showing the state of a still another spindle motor for a small-sized disc and that for a large-size disc, respectively.

With the spindle motors 70 and 80 shown in FIGS. 16 and 17, each of the turntables 71, 81 are split into plural blocks which may be moved radially of the disc depending on the size of the loaded disc to vary the sizes of the turntables 71, 81.

That is, if the small-sized disc 61 is loaded on the drive device 1, split blocks 71a, 71b of the turntable 71 are positioned at a mid portion of the turntable 71 to constitute a disc setting portion sized so as to be in register with the holding area 66 of the small-sized disc 61 in order to hold the small-sized disc 61 appropriately, as shown in FIG. 16A.

If the large-sized disc 51 is loaded on the drive device 1, the blocks 71a, 71b are moved radially of the disc to constitute a disc setting portion sized so as to be in register with the holding area 56 of the large-sized disc 51, as shown in FIG. 16B, in order to hold the large-sized disc 51 appropriately.

If a small-sized disc 61 is loaded on the drive device 1, split blocks 81a, 81b, 81c and 81d of the turntable 81 are located at a mid portion of the turntable 81 to constitute a disc setting portion sized so as to be in register with the holding area 66 of the small-sized disc 61 in order to hold the small-sized disc 61 appropriately.

Figure 17B:
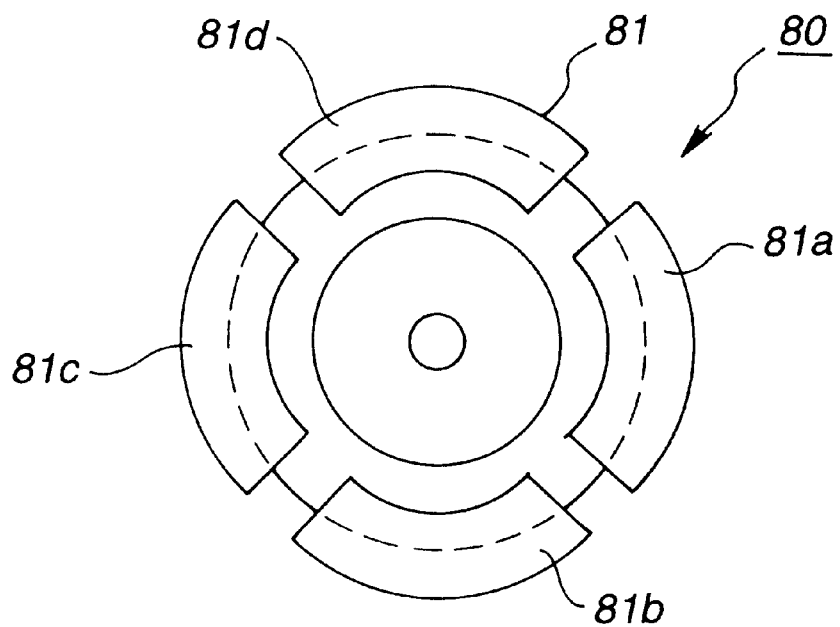

If the large-sized disc 51 is loaded on the drive device 1, the blocks 81a to 81d are moved radially of the disc to constitute a disc setting portion sized so as to be in register with the holding area 56 of the large-sized disc 51, as shown in FIG. 17B, in order to hold the large-sized disc 51 appropriately.

The spindle motor of the drive device 1 according to the present invention includes a first spindle motor 91 associated with the small-sized disc 61 and a second spindle motor 92 associated with the large-sized disc 51 so that the first spindle motor 91 or the second spindle motor 92 will be selectively used depending on the size of the disc loaded on the drive device 1.

Figure 18:
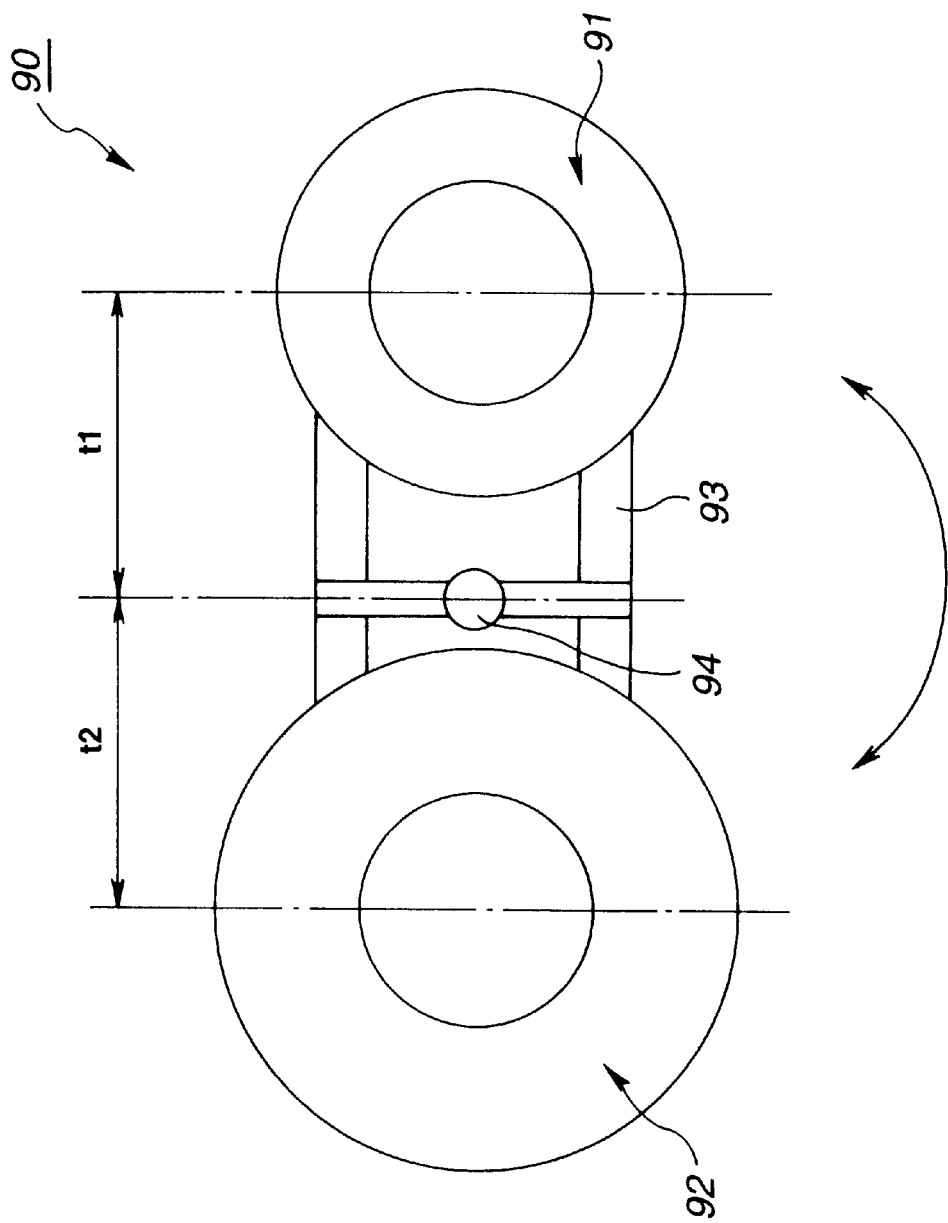
FIG. 18 is a plan view showing a further modified spindle motor.
Figure 19:
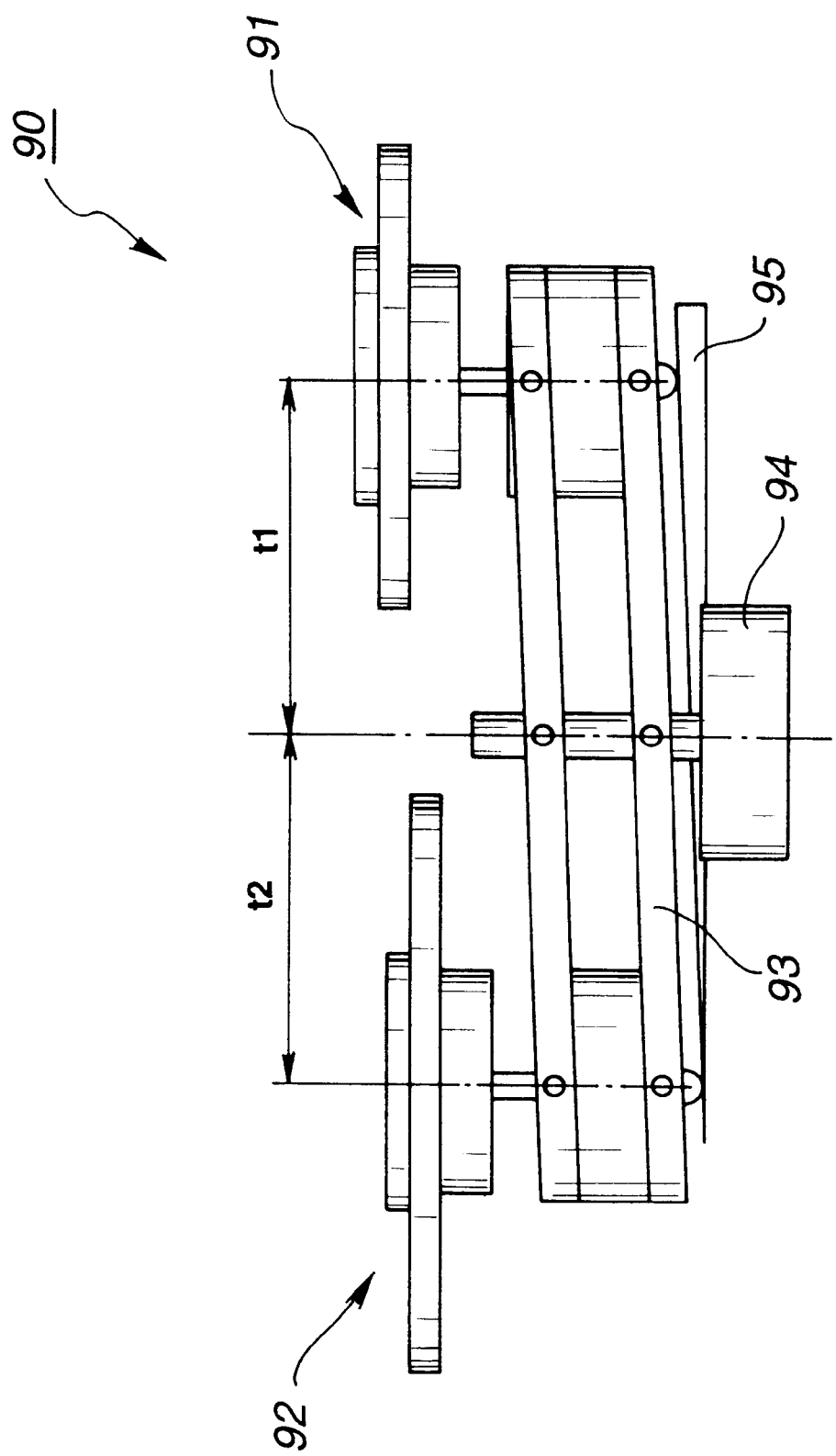
FIG. 19 is a side view showing the spindle motor of FIG. 18.

With the spindle motor 90 shown in FIGS. 18 and 19, the spindle motor 91 associated with the small-sized disc 61 and the second spindle motor 92 associated with the large-sized disc 51 are mounted on one and the opposite ends of a rotation actuating member 93. At a mid portion of the rotation actuating member 93 is mounted a rotation actuating motor 94. If the rotation actuating motor 94 is run in rotation, the rotation actuating member 93 is run in rotation to cause the first spindle motor 91 and the second spindle motor 92 to be moved in the main body unit 2.

With the spindle motor 90, the distance t1 between the rotary axis of the rotation actuating motor 94 and the rotary axis of the first spindle motor 91 is set so as to be equal to the distance t2 between the rotary axis of the rotation actuating motor 94 and the rotary axis of the spindle motor 92.

Also, the spindle motor 90 is arranged in the main body unit 2 of the drive device 1 so that the rotary axis of the rotation actuating motor 94 is positioned at a distance of t1 or t2 away from the center of the disc arranged in the main body unit 2 of the drive device 1.

When the small-sized disc 61 is loaded in the drive device 1, the rotation actuating motor 94 of the spindle motor 90 is run in rotation, so that the rotation actuating member 93 is run in rotation to shift the first spindle motor 91 in the main body unit 2 until the spindle motor is positioned in register with the disc center.

When the large-sized disc 51 is loaded on the drive device 1, the rotation actuating motor 94 is run in rotation and hence the rotation actuating member 93 is run in rotation so that the second spindle motor 92 is moved in the inside of the main body unit 2 until the spindle motor is positioned in register with the disc center.

Preferably, the spindle motor 90 is provided with a height adjustment member 95 which, when the first spindle motor 91 or the second spindle motor 92 is positioned in register with the center of the disc in the main body unit 2, sets the height position of the first spindle motor 91 or the second spindle motor 92 so as to be higher than the opposite side motor, that is the second spindle motor 92 or the first spindle motor 91.

By providing the height adjustment member 95 on the spindle motor 90 and by setting the height position of the first spindle motor 91 or the second spindle motor 2, the disc held by one of the spindle motors can be prevented from colliding against the other spindle motor, even if the distance t1 between the rotary axis of the rotation actuating motor 94 and that of the first spindle motor 91 and the distance t2 between the rotary axis of the rotation actuating motor 93 and that of the second spindle motor 92 are reduced, in order to render it possible to reduce the size of the spindle motor 90.

The spindle motor of the drive device 1 according to the present invention may also be configured so that a first turntable 102 associated with the small-sized disc 61 is provided at one of the ends of a rotary shaft 101a of a double-shaft motor 101, and a second turntable 103 associated with the large-sized disc 51 is provided on the opposite end of the rotary shaft 101a of the motor 101, with the first turntable 102 or the second turntable 103 being selectively used depending on the size of the disc loaded on the drive device 1.

Figure 20:
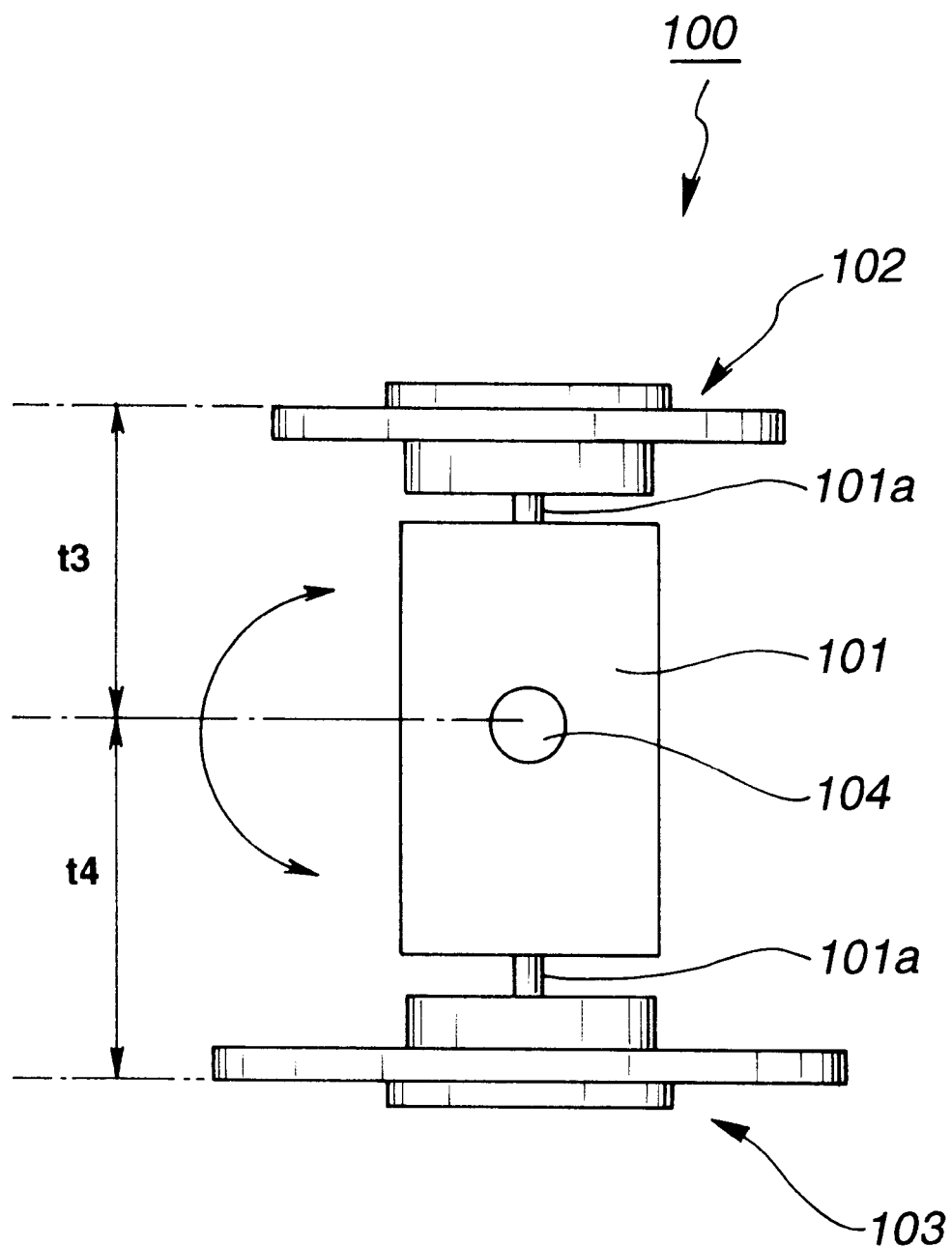
FIG. 20 is a side view showing yet another spindle motor.

At a mid position of the double-shaft motor 101 of the spindle motor 100 shown in FIG. 20, there is mounted a rotation actuating shaft 104 for rotating the double-shaft motor 101. The rotation actuating shaft 104 is connected to another motor, not shown, so that, when the other motor is run in rotation, the double-shaft motor 101 is run in rotation about the rotation actuating shaft 104 as the center of rotation. The spindle motor 100 is also designed so that the distance t3 between the rotation actuating shaft 104 and the fist turntable 102 will be equal to the distance t4 from the rotation actuating shaft 104 to the second turntable 103.

When the small-sized disc 61 is loaded on the drive device 1, the spindle motor 100 is rotated about the rotation actuating shaft 104 as the center of rotation, so that the first turntable 102 is moved to and positioned at the disc loading position.

When the large-sized disc 51 is loaded on the drive device 1, the spindle motor 100 is rotated about the rotation actuating shaft 104 as the center of rotation, so that the second turntable 103 is moved to and positioned at the disc loading position.

The spindle motor 100, adapted to cope with the large-sized disc 51 and the small-sized disc 61 using the sole double-shaft motor 101, can be reduced in size as compared to the spindle motor 90 shown in FIGS. 18 and 19. Although the drive device 1 associated with the optical disc has been explained in the foregoing, it is to be noted that the present invention can be applied to driving devices associated with other types of the disc-shaped recording mediums, such as a magnetic disc or a magneto-optical disc.

In this case, a magnetic head may be provided in place or in addition to the optical head 40.

Although the drive device 1 adapted to cope with two disc types, namely the large-sized disc 51 and the small-sized disc 61, has been explained in the foregoing, the drive device according to the present invention may also be configured for coping with a larger number of discs of different sizes.

In this case, it suffices if the height position of the tray in the main body unit of the drive device is divided in three or more stages so that pre-set disc height positions will be maintained in the main body unit in the drive device and so that the turntable size of the spindle motor will be set in the corresponding plural stages.

What is claimed is:

1. A disc drive device for holding a disc cartridge from a group of disc cartridges of different sizes conforming to the sizes of disc-shaped recording mediums held therein for recording/reproducing the disc-shaped recording mediums, comprising:

a main body unit of the disc drive device;

cartridge holding means mounted for movement relative to the main body unit of the disc drive device and having a plurality of containers corresponding to the disc cartridges of different sizes for containing the disc cartridges of different sizes within the corresponding container; and movement actuating means for causing movement of said cartridge holding means between a position in which the plurality of containers face the outside of the main body unit and a predetermined position inside the main body unit of the disc drive device;

said movement actuating means setting a height position of said cartridge holding means in said main body unit of the disc drive device depending on the size of the disc cartridge contained in the corresponding container of the cartridge holding means such that the disc-shaped recording medium in the disc cartridge is positioned at a predetermined reference height relative to the main body for all of the cartridges of different sizes.

2. The disc drive device according to claim 1 further comprising:

detection means for detecting the size of the disc cartridge contained in the container of said cartridge holding means.

3. The disc drive device according to claim 1 further comprising:

a disc holding unit for rotatably holding the disc-shaped recording medium loaded on the main body unit of the disc drive device; and rotational driving means for rotationally driving said disc holding unit;

said disc holding unit having a disc-setting area for the disc-shaped recording medium which is rendered variable depending on the size of the disc-shaped recording medium held therein.

4. The disc drive device according to claim 3 wherein said disc holding means has a plurality of turntables of different diameters;

and wherein at least one of said turntables is selectively used depending on the size of the disc-shaped recording medium held within the disc holding means.

5. The disc drive device according to claim 4 further comprising:

movement means for causing the selected turntable to be moved to the predetermined reference height.

6. The disc drive device according to claim 4 wherein said rotational driving means has a sole rotational driving shaft; and wherein said turntables are run in rotation by said sole rotational driving shaft.

7. The disc drive device according to claim 4 wherein said rotational driving means has a plurality of rotational driving shafts; and wherein said turntables are individually run in rotation by said plural rotational driving shafts.

8. The disc drive device according to claim 3 wherein said disc holding unit includes a turntable split into plural blocks; and wherein said turntable has a variable disc-setting area said blocks being moved radially of the disc-shaped recording medium depending on the size of the disc-shaped recording medium held thereon.

9. The disc drive device according to claim 1 and further comprising a disc holding unit comprising a fitting protrusion sized to be received within a central opening in the disc-shaped recording medium and a variable disc-holding area for supporting the disc-shaped recording medium, the variable disc-setting area comprising a first turntable from which the fitting protrusion projects and a second turntable moveable relative to the first turntable between a first position where the second turntable is spaced from the first turntable and a second position where the first and second turntables nest to increase the disc-setting area and thereby vary the disc-setting area.

10. The disc drive device according to claim 9 wherein the second turntable has a diameter greater than the first turntable and a recess sized to receive the first turntable, wherein when the first and second turntables are nested the first turntable is received within the recess.

11. The disc drive device according to claim 10 wherein the fitting protrusion is of a fixed size.

* * * * *